(12) United States Patent
Qin et al.

(10) Patent No.: US 11,633,060 B2
(45) Date of Patent: *Apr. 25, 2023

(54) PRESSURE COOKING APPLIANCE WITH LID

(71) Applicant: Instant Brands Inc., Kanata (CA)

(72) Inventors: Yi Qin, Ottawa (CA); Jiwei Wang, Ottawa (CA); Ling Weng, Ottawa (CA)

(73) Assignee: Instant Brands Inc., Kanata (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/522,138

(22) Filed: Nov. 9, 2021

(65) Prior Publication Data

US 2022/0061576 A1    Mar. 3, 2022

Related U.S. Application Data

(63) Continuation of application No. 16/661,004, filed on Oct. 23, 2019, now Pat. No. 11,197,572.

(30) Foreign Application Priority Data

Oct. 24, 2018   (CN) .......................... 201811247107.0

(51) Int. Cl.
*A47J 27/08* (2006.01)
*A47J 36/10* (2006.01)

(52) U.S. Cl.
CPC .......... *A47J 27/0804* (2013.01); *A47J 36/10* (2013.01)

(58) Field of Classification Search
CPC .... A47J 27/0804; A47J 27/08; A47J 27/0806; A47J 27/09; A47J 27/0815; A47J 45/06; A47J 36/06; A47J 36/10; B65D 2525/284

USPC ................................... 220/315, 212.5, 573.1
See application file for complete search history.

(56) References Cited

U.S. PATENT DOCUMENTS

| | | | | |
|---|---|---|---|---|
| 4,487,117 A | * | 12/1984 | Colley | A47J 36/38 99/341 |
| 10,653,269 B1 | * | 5/2020 | Jamison | A23L 5/10 |
| 11,197,572 B2 | * | 12/2021 | Qin | A47J 27/0804 |
| 2016/0198883 A1 | * | 7/2016 | Wang | A23L 5/15 426/231 |

(Continued)

FOREIGN PATENT DOCUMENTS

| | | |
|---|---|---|
| CN | 201085461 | 7/2008 |
| CN | 201147192 | 11/2008 |

(Continued)

*Primary Examiner* — Javier A Pagan
(74) *Attorney, Agent, or Firm* — Crowell & Moring LLP (57) ABSTRACT

A pressure cooking appliance is provided. The pressure cooking appliance comprises a cooker body and a lid, the lid comprising an upper lid portion, and a lower lid portion lockingly covering the cooker body to form a pressurized cooking chamber therebetween. The upper lid portion covers the lower lid portion from above, and comprises a main lid body and a removable cover, the main lid body comprising an opening portion formed at a central portion of the main lid body for exposing the lower lid portion, the removable cover being removably attachable to the opening portion and operable to expose a portion of the lower lid portion for accelerated cooling of the cooking chamber and speeding up wait time for opening the lid. Further, cooling towel or cooling pack can be placed at the opening portion to help with cooling and allow food to be enjoyed sooner.

20 Claims, 8 Drawing Sheets

(56) References Cited

U.S. PATENT DOCUMENTS

2020/0221895 A1* 7/2020 Peng .................... A47J 27/0802
2021/0068578 A1* 3/2021 Peng .................... A47J 27/092

FOREIGN PATENT DOCUMENTS

| CN | 201356428 | 12/2009 |
| CN | 102885575 | 1/2013 |
| CN | 203647068 | 6/2014 |
| CN | 206507758 | 9/2017 |
| CN | 108451351 | 8/2018 |
| GB | 2093333 | 2/1982 |

* cited by examiner

PRESSURE COOKING APPLIANCE WITH LID

CROSS REFERENCE TO RELATED APPLICATIONS

This application is a continuation of U.S. patent application Ser. No. 16/661,004, filed on Oct. 23, 2019, pending, which claims priority to China Patent Application 201811247107.0, filed on Oct. 24, 2018, and is entitled "A Pressure Cooking Appliance with Lid", the entireties of which are hereby incorporated by reference.

FIELD OF THE INVENTION

The present invention relates to a pressure cooking appliance.

BACKGROUND OF THE INVENTION

Certain cooking appliances, for instance a pressure cooking appliance, may be equipped with a lid, which usually includes an upper lid portion and a lower lid portion, wherein the lower lid portion is made for lockingly covering the body of the pressure cooker to form a cooking chamber and is generally made of materials of relatively high strength, such as stainless steel. The upper lid portion is generally made of plastic or similar materials for substantially entirely covering an upper side of the lower lid portion and forming an insulation chamber between the upper lid portion and the lower lid portion, so as to prevent a user from being scalded through accidental contact with the lower lid portion. As far as the pressure cooker is concerned, the lid may include a pressure-limiting device for controlling the cooking pressure, wherein the pressure-limiting device can be operable to discharge air from the cooking chamber to reduce the pressure and temperature of the cooking chamber, so that the lid can be opened safely after the cooking is completed. However, relying only on such pressure-limiting device and natural cooling will result in slow cooling speed, which is unsatisfactory to consumers' need for rapid cooking.

Therefore, there is a need for improvements to the current cooking appliances.

SUMMARY OF THE INVENTION

The present invention provides a pressure cooking appliance and a lid thereof capable of facilitating the rapid cooling of the temperature of the cooking chamber of the pressure cooking appliance.

In accordance with one aspect of the present disclosure, there is provided a lid for a pressure cooking appliance, the lid comprising an upper lid portion and a lower lid portion, the lower lid portion being constructed and arranged for lockingly covering a cooker body of the pressure cooking appliance to form a cooking chamber therebetween for pressurized cooking, the upper lid portion being disposed above the lower lid portion and substantially covers the lower lid portion, the upper lid portion comprising a main lid body and a removable cover, the main lid body comprising an opening portion formed substantially at a central portion of the main lid body for exposing the lower lid portion or at least a portion thereof, the removable cover being removably attachable to the opening portion and operable to expose at least a portion of the lower lid portion for accelerating the cooling of the cooking chamber, thereby speeding up a wait time for safely opening the lid.

In accordance with some embodiments of the present disclosure, the removable cover of the upper lid portion comprises a substantially planar main body and a handle portion disposed at a front side rim of the removable cover, wherein the handle portion is oriented upward angularly relative to the substantially planar main body for allowing access by hand to an underside of the handle portion and manual lifting of the handle portion.

In accordance with some embodiments of the present disclosure, a front side portion of the handle portion of the removable cover and a rim portion of the opening portion form a gap for accommodating access by hand to an underside of the handle portion.

In accordance with some embodiments of the present disclosure, the removable cover of the upper lid portion comprises a grid structure having a plurality of through-grooves for reducing the material cost of the removable cover.

In accordance with some embodiments of the present disclosure, the removable cover comprises at least one pin disposed near a rear end of a peripheral sidewall of the removable cover, and a fastener disposed near a front end of the peripheral sidewall of the removable cover; wherein an inner sidewall of the main lid body defining the opening portion comprises at least one corresponding slot for receiving the at least one pin, and a socket for receiving the fastener, so as to secure the removable cover substantially within the opening portion of the main lid body.

In accordance with some embodiments of the present disclosure, the area of the removable cover is at least $\frac{1}{5}$ of the total area of the upper lid portion.

In accordance with some embodiments of the present disclosure, the lid comprises an arch shaped lid handle, wherein the removable cover is located under the lid handle.

In accordance with some embodiments of the present disclosure, the lower lid portion comprises a downward receiving recess disposed thereon and positioned to substantially correspond with the removable cover, for providing an increased space for receiving a cooling pack, cooling towel, or coolant.

In accordance with another aspect of the present disclosure, there is provided a pressure cooking appliance comprising a cooker body and a lid for a pressure cooking appliance as described above, wherein the lid is constructed and arranged for covering the cooker body.

In accordance with some embodiments of the present disclosure, the cooker body comprises two latch slots disposed on a rear side thereof, the upper lid portion comprises two latch bars disposed near a rear periphery thereof, wherein each of the latch slots is configured for receiving one of the latch bars therein so that the lid is supported near the rear side of the cooker body in an outwardly inclined upright orientation.

Using the cooking appliance in accordance with the present disclosure, upon completion of the cooking process, the removable cover of the upper lid portion can be detached therefrom to expose the lower lid portion, thereby facilitating the cooling of the cooking chamber. In addition, cooling towel or cooling pack can be placed at the opening portion of the main lid body to help with cooling and allow the cooked food to be enjoyed sooner.

It is to be understood that, the aforementioned general description and the detailed description that follows are exemplary and explanatory, and are not limiting or exhaustive as to the embodiments of the present invention.

REFERENCE NUMERALS 1 lid
11, 51 upper lid portion
110 mounting seat
111 sliding member
112 main lid body
113, 53 removable cover
114, 510 opening portion
115 handle portion
116 gap
117 latch bar
12, 52 lower lid portion
120 lid tooth
13 lid handle
131 fastening end
132 intermediate section
14 pressure-limiting valve
15 installation cover
16 opening-stop mechanism
2 cooker body
21 inner pot
22 heat insulation cover
220 cooker tooth
23 exterior shell
24 intermediate plate
240 sliding seat
241 sliding groove
242 latch slot
25 base
26 heating element
520 receiving recess

DETAILED DESCRIPTION

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices, systems, equipment and methods consistent with some aspects of the present disclosure as detailed in the appended claims.

Figure 1:
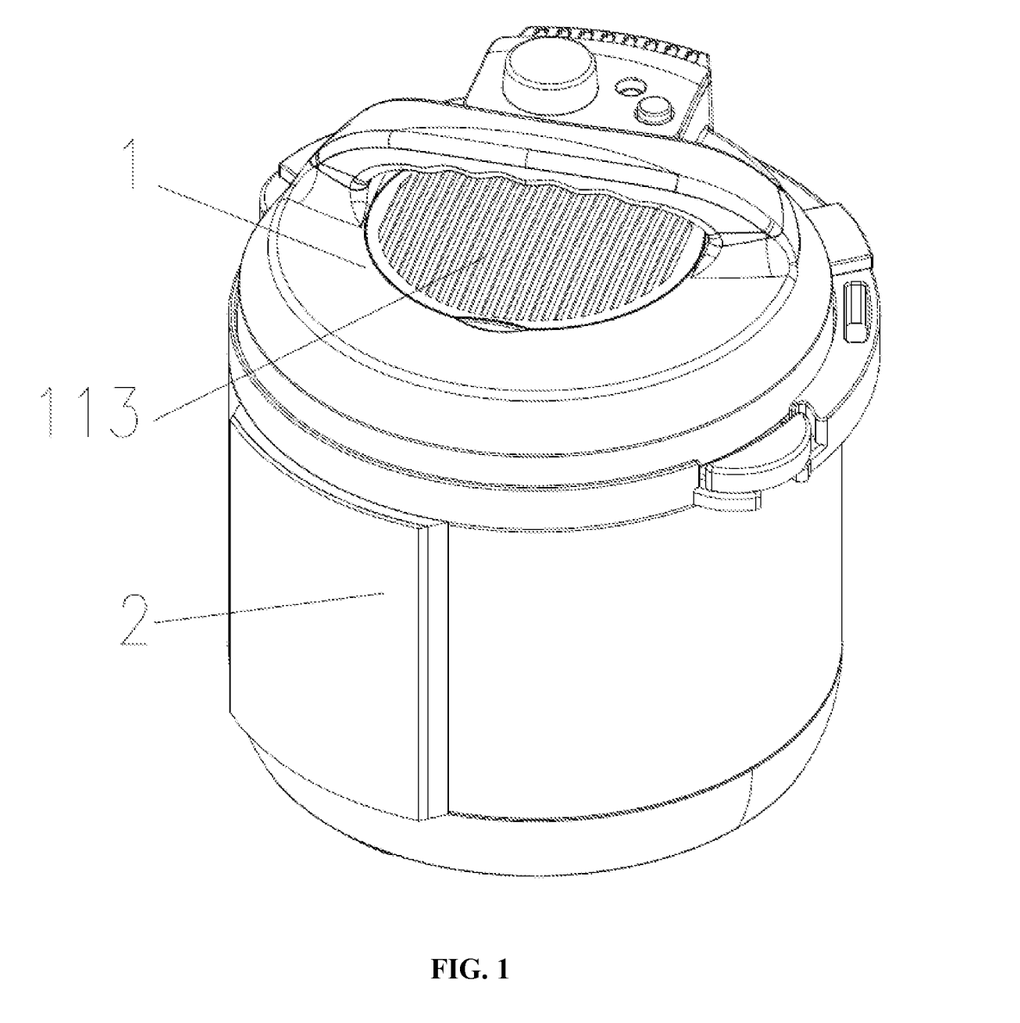
FIG. 1 is a perspective view illustrating a pressure cooking appliance in accordance with an example embodiment of the present disclosure.
Figure 2:
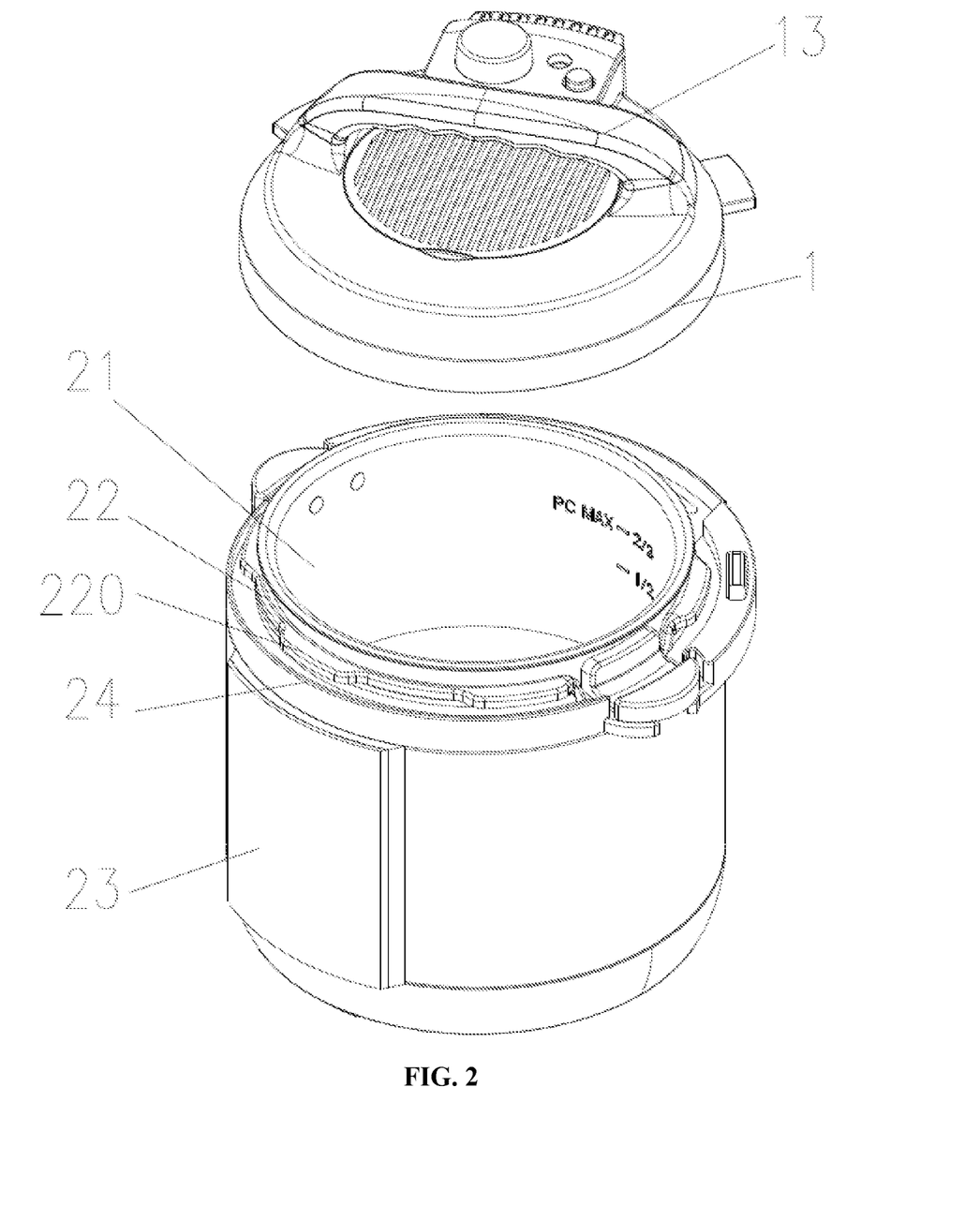
FIG. 2 is a perspective view showing the pressure cooking appliance of FIG. 1 having a lid and a cooker body shown in separation.
Figure 5:
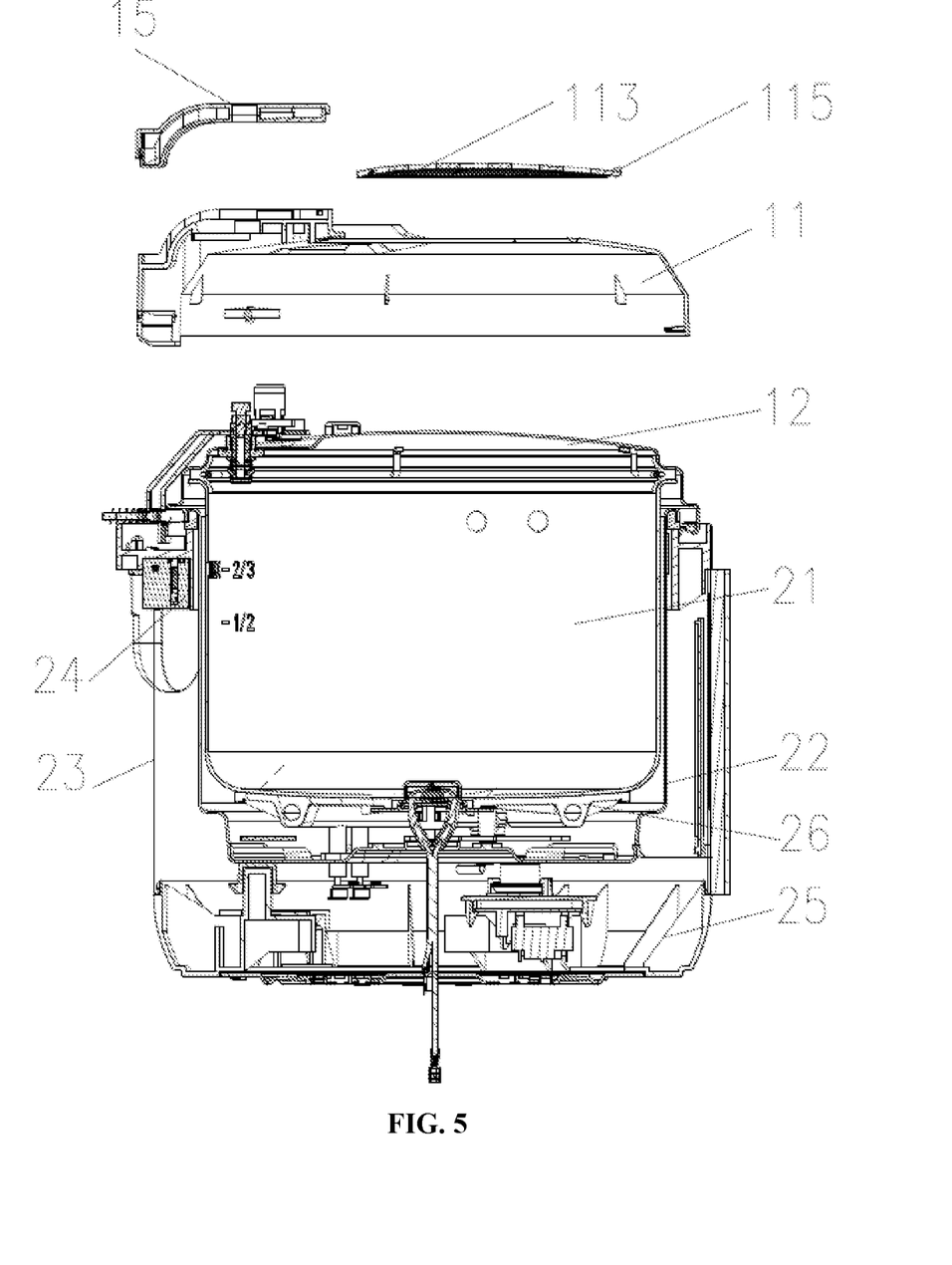
FIG. 5 is a sectional view of the pressure cooking appliance of FIG. 3.

Referring to FIGS. 1 and 2, a cooking appliance according to an embodiment of the present disclosure is illustrated as a pressure cooking appliance, comprising a lid 1 and a cooker body 2, the lid 1 being constructed and arranged for covering the cooker body 2. With reference to FIG. 5, the cooker body 2 comprises an inner pot 21 and a pot body for housing the inner pot 21, the pot body comprising a heat insulation cover 22, an exterior shell 23, an intermediate plate 24, a base 25, and a heating element 26. The inner pot 21 is housed within the heat insulation cover 22, the exterior shell 23 encloses the intermediate plate 24, the base 25 is secured below the intermediate plate 24, wherein the intermediate plate 24, the exterior shell 23, and the base 25 together form a cavity for receiving the heat insulation cover 22. The inner pot 21 and the heat insulation cover 22 may be made of stainless steel. Conventional heating plate or solenoid disc can be adopted to construct the heating element 26, wherein the heating element 26 is disposed substantially between a bottom portion of the inner pot 21 and a bottom portion of the heat insulation cover 22, for heating the inner pot 21. In use, the inner pot 21 and the lid 1 form an enclosed cooking chamber for pressurized cooking.

Figure 3:
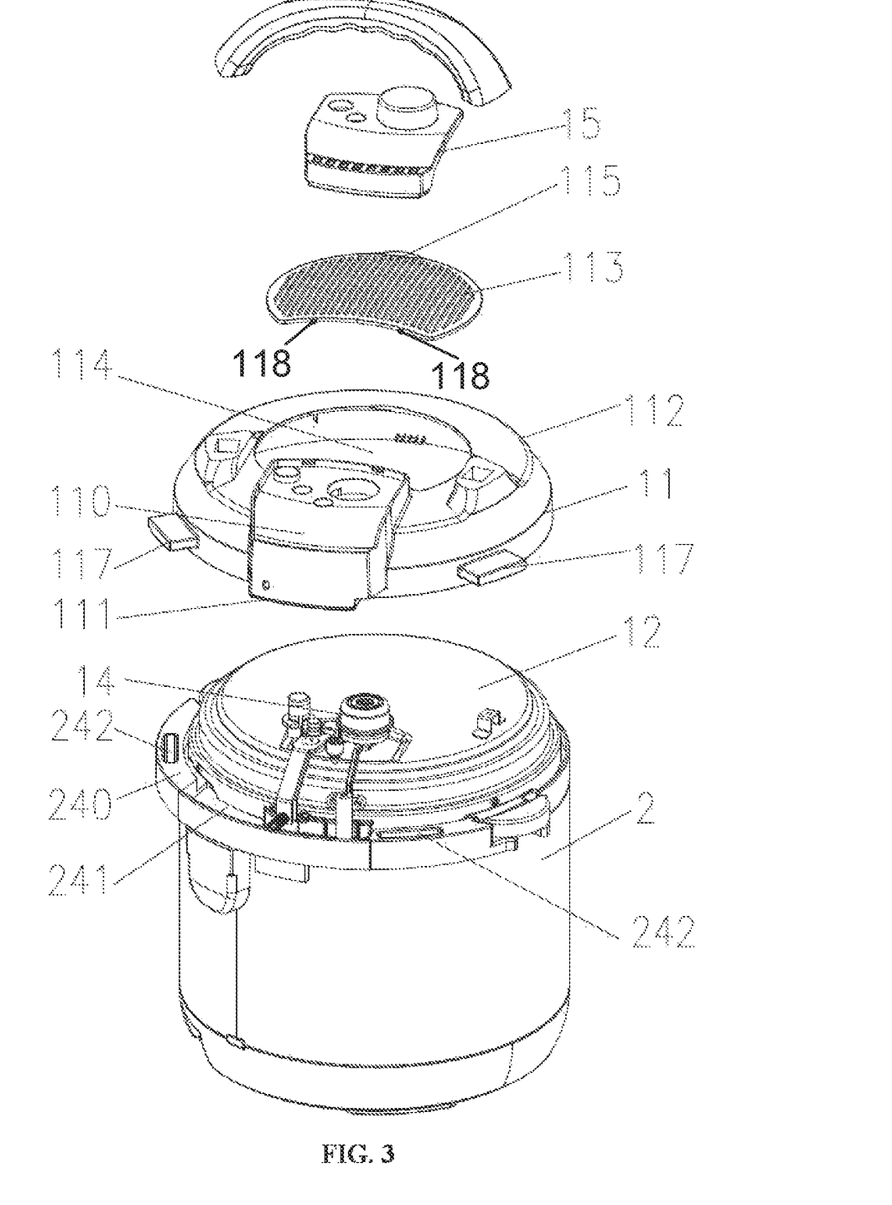
FIG. 3 is a perspective exploded view of the pressure cooking appliance of FIG. 1.
Figure 4:
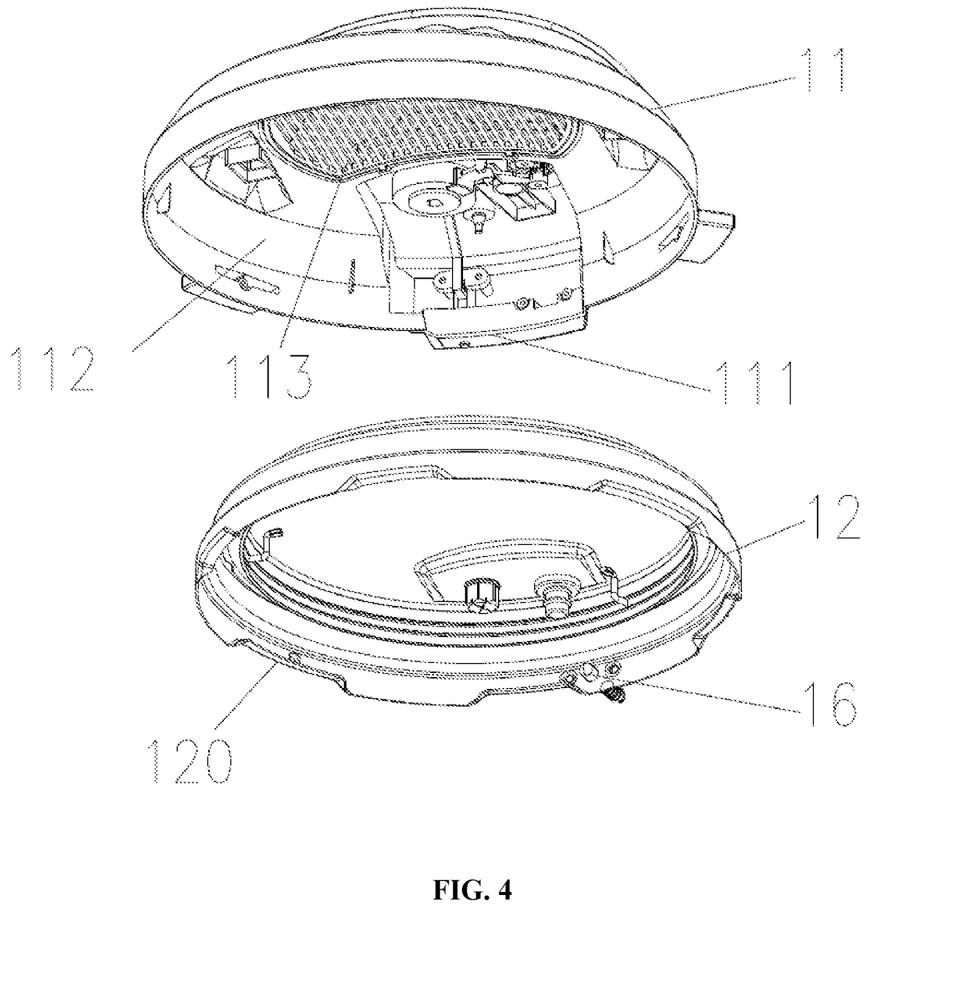
FIG. 4 is a partial perspective exploded view of the lid of the pressure cooking appliance of FIG. 1.

The lid 1 and cooker body 2 of the cooking appliance in accordance with example embodiments of the present disclosure are constructed and arranged to have a separable configuration, wherein the lid 1 can be completely removed or detached from the cooker body 2. With reference to FIGS. 3 and 4, the lid 1 comprises an upper lid portion 11 and a lower lid portion 12, wherein the upper lid portion 11 is disposed to cover a top portion and an exterior periphery portion of the lower lid portion 12. The upper lid portion 11 is formed by way of injection molding of plastic materials, whereas the lower lid portion 12 is substantially made of stainless steel.

A sliding seat 240 is disposed near a top portion of a rear sidewall of the intermediate plate 24, wherein a sliding groove 241 is disposed on the sliding seat 240. A mounting seat 110 is disposed at a rear side of the upper lid portion 11, wherein a sliding member 111 is disposed at a lower portion of the mounting seat 110 and extends downwardly therefrom beyond a bottom rim of the lid 1, and wherein the sliding member 111 is constructed and arranged for insertion into the sliding groove 241 and gliding movement therein. The sliding groove 241 is substantially arc shaped, and has stopper walls disposed at two ends of the sliding groove 241 for preventing the sliding member 111 from moving outside of the sliding groove 241. By way of the mutual engagement between the sliding member 111 and the sliding groove 241, the lid 1 can rotate relative to the cooker body 2 between a lid open position and a lid lock position. When the lid is at the lid open location, a user can grasp a lid handle 13 disposed on top of the lid 1 and lift the lid 1.

When the lid is at the lid lock location, the lid 1 and the cooker body 2 are mutually latched. Referring to FIGS. 2 and 4, the lower lid portion 12 comprises one or more inwardly extending lid teeth 120 formed along a periphery rim of the lower lid portion 12. The heat insulation cover 22 comprises one or more outwardly extending cooker teeth 220 disposed along a top rim thereof, wherein the lid teeth 120 and the cooker teeth 220 are constructed and arranged to mutually latch to ensure that the lid 1 is locked onto the cooker body 2 during cooking, and that the lid 1 and the inner pot 21 form an enclosed cooking chamber therebetween. The lid 1 may have a pressure-limiting valve 14 disposed thereon and in communication with the cooking chamber, wherein the pressure-limiting valve 14 is operable to be opened upon completion of the cooking process to discharge air from the cooking chamber, so that the temperature and pressure in the cooking chamber can be quickly lowered, thereby allowing the lid to be opened safely in a short time.

Now referring to FIGS. 3 and 5, wherein the lid handle 13 is not shown in FIG. 5. The upper lid portion 11 is disposed on top of the lower lid portion 12. The upper lid portion comprises a main lid body 112 and a removable cover 113, wherein the main lid body 112 is substantially annular-shaped, and has a substantially centrally disposed opening portion 114 extending through a top wall of the main lid body 112, wherein the opening portion 114 is configured to expose the lower lid portion 12 or a portion thereof, wherein the removable cover 113 is constructed and arranged to be removably attachable to the opening portion 114 and operable to expose at least a portion of the lower lid portion 12 for accelerating the cooling of the cooking chamber, thereby speeding up a wait time for safely opening the lid.

The removable cover 113 can be fastened or secured to the opening portion 114. In some embodiments, at least one pin 118 is disposed near a rear end of a peripheral sidewall of the removable cover 113, and a fastener 119 (referring to FIGS. 7 and 8) is disposed near a front end of the peripheral sidewall of the removable cover; wherein an inner side wall of the main lid body defining the opening portion 114 comprises at least one corresponding slot 121 and a socket 122 for receiving the at least one pin 118 and the fastener 119, respectively, wherein the removable cover 113 can be secured within the confine of the opening portion 114 by firstly inserting the at least one pin into the corresponding slot, followed by downwardly pressing the removable cover 113 so that the fastener thereon is secured to the corresponding socket.

When the cooking process is completed, the removable cover 113 can be detached to expose the lower lid portion 12 thereunder, which is a top wall of the cooking chamber, thereby facilitating the cooling of the cooking chamber. Alternatively, cold towels or ice bags can be placed at the opening portion 114 to help with the rapid cooling of the cooking chamber so as to allow the cooked food to be enjoyed sooner.

Figure 6:
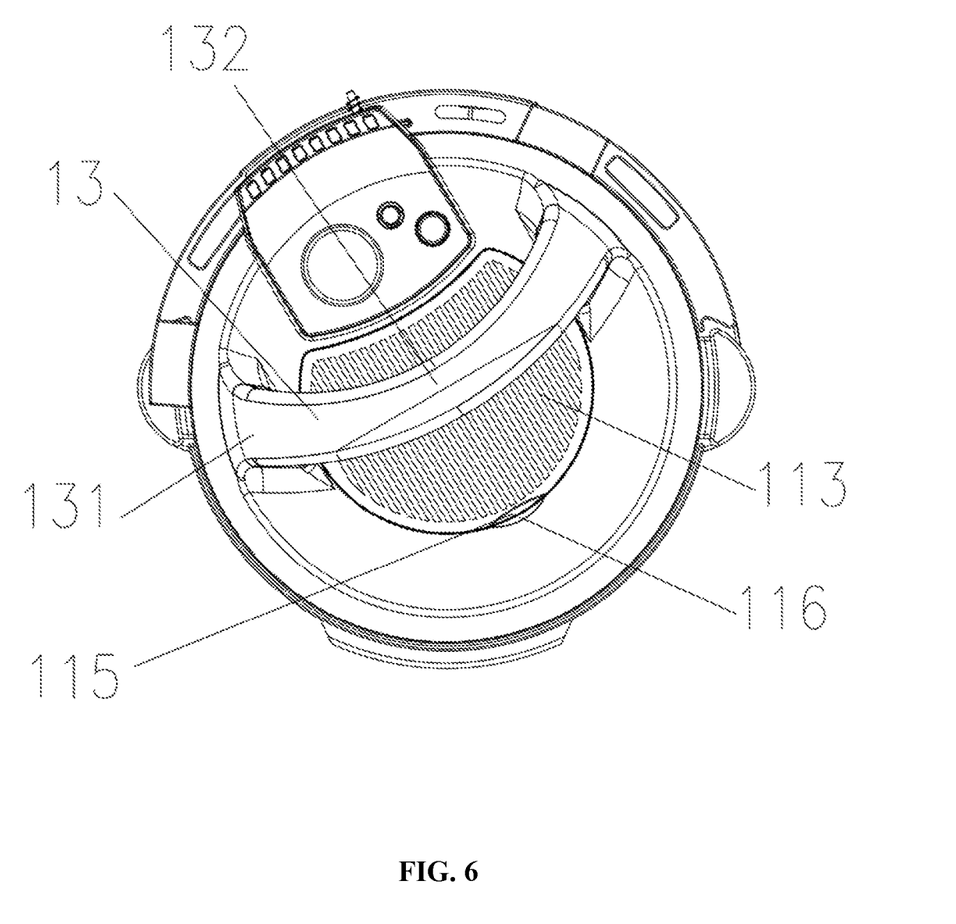
FIG. 6 is a top view of the pressure cooking appliance of FIG. 1.

In some embodiments, a handle portion 115 is formed at a front side rim of the removable cover 113, wherein the removable cover 113 is substantially planar, wherein the handle portion 115 is oriented upward angularly relative to a main plane of the removable cover 113 for allowing a user to access an underside of the handle portion 115 and manually move the handle portion 115 upward, thereby lifting the removable cover 113. The removable cover 113 is shaped to substantially conform to the shape of the opening portion 114, for securing the removable cover 113 to the opening portion 114. With reference to FIG. 6, a front side portion of the handle portion 115 and a rim portion of the opening portion 114 form a gap 116 having a shape similar to a crescent. In use, a user can access an underside of the handle portion 115 by hand via gap 116, and move the handle portion 115 upwardly to easily detach the removable cover 113 from the main lid body 112, to start rapid cooling of the cooking chamber.

Preferably, the removable cover 113 comprises a grid structure having a plurality of through-grooves for reducing the quantity and cost of the materials required. The upper lid portion 11 may further comprise an installation cover 15, wherein the installation cover 15 is disposed on top of the mounting seat 110 of the upper lid portion 11.

In some embodiments, the area of the removable cover 113 is at least ⅕ of the area of the entire upper lid portion 11, since a smaller area would be less effective in cooling.

With reference to FIG. 6, the lid handle 13 is secured on top of the main lid body 112 of the upper lid portion 11, wherein the lid handle 13 comprises two fastening ends 131 and an intermediate section 132, wherein the two fastening ends 131 are symmetrically fastened on the left and right sides of the installation cover 15, respectively, wherein the intermediate section 132 is constructed and arranged to curve upwardly relative to the two fastening ends 131 to form an arch, wherein the removable cover 113 is located under the lid handle 13 for ease of detachment of the removable cover 113, and wherein the arch shape of the lid handle provides improved ergonomics in conformity with human body mechanics, thereby making the lid opening operation easier for users.

In some embodiments, the lid 1 further comprises certain safety devices disposed thereon, for example an opening-stop mechanism 16 (see FIG. 4), wherein when the pressure in the cooking chamber exceeds a predetermined value, the opening-stop mechanism operates to keep the lid 1 at a locked position where it cannot be rotated, thereby preventing scald injuries caused by hot food spurting due to the high pressure in the cooking chamber.

In some embodiments, the sliding seat 240 of the intermediate plate 24 further comprises at least one latch slot 242, wherein the at least one latch slot 242 extends in a vertical direction. The upper lid portion 11 comprises one or more latch bars 117 disposed near a rear periphery thereof, the latch bars 117 extend outwardly and horizontally from a periphery of a horizontally placed upper lid portion 11, whereas when the lid 1 is oriented vertically, the latch bars 117 can be inserted downwardly into the at least one latch slot 242, so that the lid 1 is supported near a rear side of the pot body, thereby avoiding muddling the countertop with the lid 1 while affording users the convenience of accessing the food. In some embodiments, two latch slots 242 are disposed on the intermediate plate 24 and symmetrically positioned at both ends of the sliding groove 241, respectively. Each of the latch bars 117 can be inserted into a corresponding latch slot 242 so that the lid 1 is supported near a rear side of the cooker body 2 in an outwardly inclined upright orientation. Advantageously, the latch slot 242 on the right side will facilitate right-handed insertion operation, whereas the latch slot 242 on the left side will facilitate left-handed insertion operation. Further, placing the lid 1 in an outwardly inclined orientation helps a user avoid scalds caused by accidental contact with the lid 1.

Figure 7:
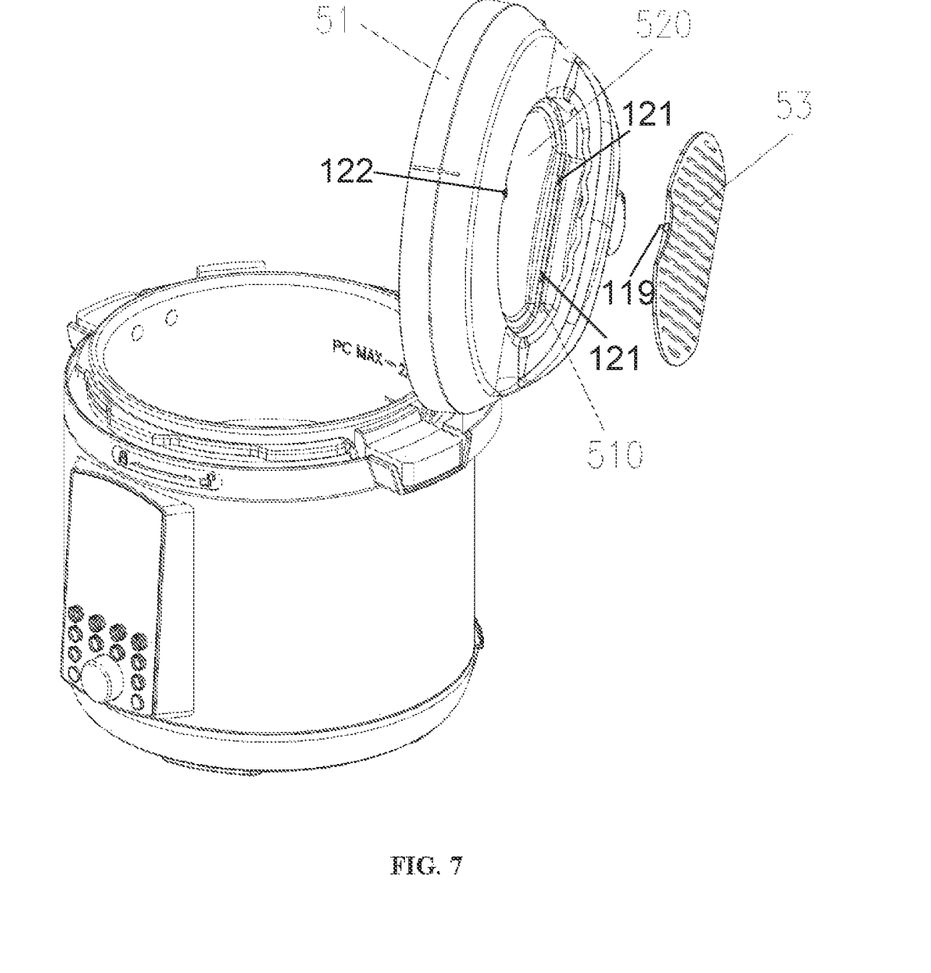
FIG. 7 is a perspective view illustrating a pressure cooking appliance in accordance with another example embodiment of the present disclosure.
Figure 8:
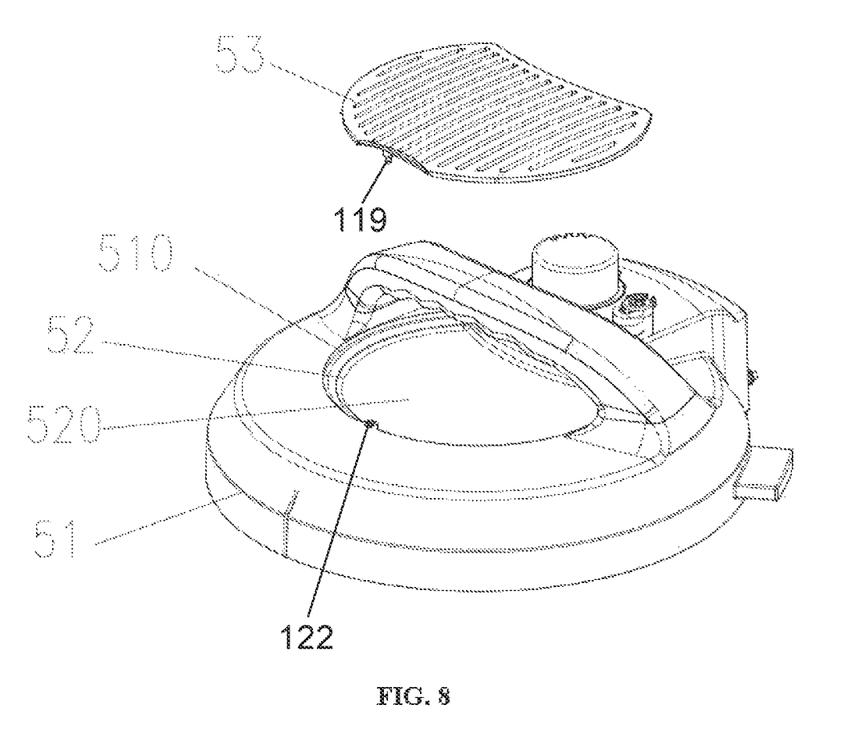
FIG. 8 is a perspective view of a lid of the pressure cooking appliance of FIG. 7.

Referring to FIGS. 7 and 8, there is shown a perspective view of a pressure cooking appliance with a lid in accordance with another example embodiment of the present disclosure. This embodiment differs from the aforementioned embodiments only in the lid structure. The lid comprises an upper lid portion 51, a lower lid portion 52, and a removable lid cover 53, wherein the upper lid portion 51 comprises an opening portion 510 configured for exposing the lower lid portion 52 or a portion thereof, wherein the removable cover 53 is constructed and arranged to be assembled to the opening portion 510 and is operable to removably cover the opening portion 510 or a portion thereof. The lower lid portion 52 comprises a downward receiving recess 520 disposed thereon and positioned to substantially correspond with the removable cover 53, for providing an increased space for receiving an ice pack, cooling towel, or coolant. Advantageously, inserting ice pack or cooling towel or the like into the receiving recess 520 will increase a cooling surface area contacting with the lower lid portion 52 while reducing the area exposed to ambient air, thereby improving the cooling effect. The other elements of this embodiment of the pressure cooking appliance are substantially the same as those described earlier, and will not be repeated herein.

The terms used in the present application are for the purpose of describing particular embodiments only, and are not intended to limit the present application. As used herein and in the appended claims, the singular forms "a", "an", and "the" are intended to include the plural forms unless the context clearly dictates otherwise. It should also be understood that, as used herein, the term "and/or" refers to and includes any or all possible combinations of one or more of the associated listed items.

The foregoing is only preferred embodiments of the present application only, and is not intended to limit the present application. Any modifications, equivalent substitutions, improvements, etc., which are made within the spirit and principles of the present application should be included within the scope of protection of the present application.

The invention claimed is:

1. A lid for a cooking appliance, the lid comprising:
an upper lid portion;
a lower lid portion, the lower lid portion being constructed for covering a cooker body of the cooking appliance to form a cooking chamber therebetween;
wherein the upper lid portion is disposed above the lower lid portion and covering the lower lid portion;
the upper lid portion comprises a main lid body and a removable cover;
the main lid body comprising an opening portion formed at a central portion of the main lid body for exposing at least a portion of the lower lid portion; and,
the removable cover being removably attachable to the opening portion and operable to expose the portion of the lower lid portion;
wherein the portion of the lower lid portion that is exposed by removing the removable cover is the portion of the lower lid portion that is fully defined by the opening portion of the main lid body.

2. The lid of claim 1, wherein the portion of the lower lid portion exposed by removing the removable cover is a surface absent openings through the lower lid portion.

3. The lid of claim 1, wherein the removable cover comprises:
a handle portion disposed at a side rim of the removeable cover;
a main body; and,
wherein the handle portion is oriented upward relative to the main body for allowing access to an underside of the handle portion.

4. The lid of claim 3, wherein a side portion of the handle portion of the removable cover and a rim portion of the opening portion form a gap for accommodating access to an underside of the handle portion.

5. The lid of claim 1, wherein the removable cover comprises a grid structure having a plurality of through-grooves.

6. The lid of claim 1, wherein the removable cover comprises:
at least one pin disposed near a first end of a peripheral sidewall of the removable cover;
a fastener disposed near a second end of the peripheral sidewall of the removable cover; and
wherein a sidewall of the main lid body defining the opening portion comprises at least one corresponding slot for receiving the at least one pin, and a socket for receiving the fastener, so as to secure the removable cover within the opening portion.

7. The lid of claim 1, wherein the area of the removable cover is at least ⅕ of the total area of the upper lid portion.

8. The lid of claim 1, further comprising:
a lid handle disposed thereon, the lid handle being curved upwardly; and
wherein the removable cover is located at least partially under the lid handle.

9. The lid of claim 1, wherein the lower lid portion further comprises a downward receiving recess disposed thereon and positioned to correspond with the removable cover.

10. A pressure cooking appliance, comprising:
a pressure cooker body including cooker teeth; and
a pressure cooker lid including lid teeth, wherein the cooker teeth and the lid teeth are configured to mutually latch to ensure the pressure cooker lid is locked onto the pressure cooker body during cooking, the pressure cooker lid further comprising:
an upper lid portion;
a lower lid portion, the lower lid portion being constructed for covering the cooker body of the cooking appliance to form a cooking chamber therebetween;
wherein the upper lid portion is disposed above the lower lid portion and covering the lower lid portion;
the upper lid portion comprises a main lid body and a removable cover;
the main lid body comprising an opening portion formed at a central portion of the main lid body for exposing at least a portion of the lower lid portion; and
the removable cover being removably attachable to the opening portion and operable to expose the portion of the lower lid portion;
wherein the portion of the lower lid portion that is exposed by removing the removable cover is the portion of the lower lid portion that is fully defined by the opening portion of the main lid body.

11. The cooking appliance of claim 10, wherein the portion of the lower lid portion exposed by removing the removable cover is a surface absent openings through the lower lid portion.

12. The cooking appliance of claim 10, wherein:
the cooker body comprises two latch slots disposed on a side thereof;
the upper lid portion comprises two latch bars disposed at a periphery thereof; and
wherein each of the latch slots is configured for receiving one of the latch bars therein so that the lid is supported at the side of the cooker body in an upright orientation.

13. The cooking appliance of claim 10, wherein the removable cover comprises:
a handle portion disposed at a side rim of the removeable cover;
a main body; and
wherein the handle portion is oriented upward relative to the main body for allowing access by hand to an underside of the handle portion.

14. The cooking appliance of claim 10, wherein the removable cover comprises a grid structure having a plurality of through-grooves.

15. The cooking appliance of claim 10, wherein the removable cover comprises:
at least one pin disposed near a first end of a peripheral sidewall of the removable cover;

a fastener disposed near a second end of the peripheral sidewall of the removable cover; and wherein an inner sidewall of the main lid body defining the opening portion comprises at least one corresponding slot for receiving the at least one pin, and a socket for receiving the fastener, so as to secure the removable cover within the opening portion.

16. The cooking appliance of claim 10, wherein the area of the removable cover is at least ⅓ of the total area of the upper lid portion.

17. The cooking appliance of claim 10, wherein the lid further comprises:
    a lid handle disposed thereon; and
    wherein the removable cover is located at least partially under the lid handle.

18. The cooking appliance of claim 10, wherein the lower lid portion further comprises a downward receiving recess disposed thereon and positioned to substantially correspond with the removable cover.

19. A method of using the cooking appliance of claim 10, the method comprising:
    securing the lid to the cooker body;
    increasing a temperature within the cooking appliance; and,
    removing the removable cover from the opening portion to expose at least a portion of the lower lid portion.

20. The method of claim 19, further comprising applying at least one of a cooling pack, a cooling towel, or a coolant to the lower lid portion through the opening portion.

* * * * *